BIGGS, GRANGER & BUTLER.
Combined Band Cutter and Feeder for Thrashing Machines.
No. 84,726. Patented Dec. 8, 1868.
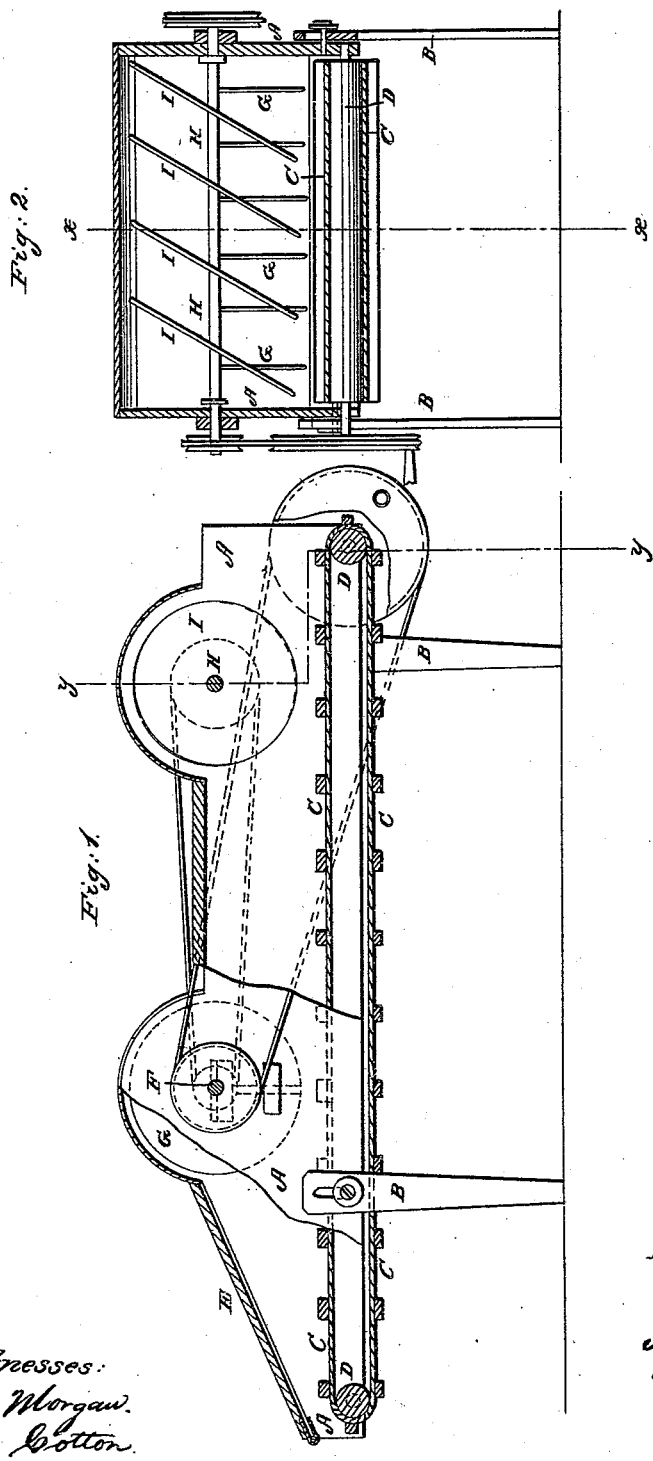

P. G. BIGGS, H. A. BUTLER, AND H. GRANGER, OF MACON, MISSOURI.

Letters Patent No. 84,726, dated December 8, 1868.

IMPROVEMENT IN COMBINED BAND-CUTTER AND FEEDER FOR THRESHING-MACHINES.

The Schedule referred to in these Letters Patent and making part of the same.

*To all whom it may concern:*

Be it known that we, P. G. BIGGS, H. A. BUTLER, and H. GRANGER, of Macon, in the county of Macon, and State of Missouri, have invented a new and useful Improvement in Combined Band-Cutter and Feeder; and we do hereby declare that the following is a full, clear, and exact description thereof, which will enable those skilled in the art to make and use the same, reference being had to the accompanying drawings, forming part of this specification, in which—

Figure 1 is a side view of our improved machine, partly in section through the line $x\ x$ of fig. 2.

Figure 2 is a detailed cross-section of the same, taken through the line $y\ y$, fig. 1.

Similar letters of reference indicate corresponding parts.

Our invention has for its object to furnish an improved machine, by means of which the bands of the bundles or sheaves of grain may be cut and fed automatically to the threshing-machine, with a spreading-movement, so as to enter the said threshing-machine in proper position for being threshed; and It consists in the construction and combination of various parts of the machine, as hereinafter more fully described.

A is the frame or case of the machine, which is supported upon legs B.

The legs B are adjustably pivoted to the frame A, so that they may be adjusted to support the machine at the proper height, and so that they may be turned up along the sides of the machine for convenience of transportation.

C is the carrier, consisting of an endless apron or belt, provided with cross-slats or ribs, which endless belt passes around rollers D, pivoted to the ends of the frame A, as shown in figs. 1 and 2.

E is the inclined platform or apron, attached to the forward end of the machine, and which, when in use, should be set at an angle or inclination of about forty degrees, (40°,) so that the bundles or sheaves, when placed upon it, may slide down to the carrier C.

The platform or apron E may be stationarily attached to the frame of the machine, or it may be hinged to said frame, so that when not in use, it may be turned down over the forward part of the machine, in the manner of a lid, as shown in fig. 1, for convenience in transportation.

F is a shaft, having a series of circular knives or cutters, G, attached to it, which, as the bundles or sheaves are being carried forward by the carrier C, cut the bands of said bundles.

The shaft F is pivoted to the frame A by means of adjustable bearings, so that it may be raised or lowered to adjust its position to the size of the bundles to be operated upon.

From the band-cutter F G, the cut bundles are carried by the carrier C to the spreader.

H is a shaft, revolving in bearings in the frame A, and to which is attached a series of wheels or disks, I.

The disks I are securely attached to the shaft H, and are set at an angle of about sixty degrees, (60°,) as shown in fig. 2, to spread the bundles as they are carried forward by the carrier C, and deliver them to the thresher in proper condition to be operated upon by the threshing-cylinder; the inclined disks I acting upon the said bundles, so as to produce an effect similar to that produced in spreading the bundles by hand.

The shafts of the band-cutter and spreader, and one of the rollers of the carrier, are geared to each other and to the threshing-cylinder by bands and pulleys, so as to be driven by said threshing-cylinder.

By this means the machine will be driven faster or slower, according as the movement of the said threshing-cylinder may be faster or slower, thus feeding the grain to the thresher faster or slower, as it may be required.

In using the machine, the platforms of the thresher are removed, and the end of the machine is bolted to the end of the thresher, so that the grain may pass directly from the carrier C to the said thresher.

We claim as new, and desire to secure by Letters Patent—

The spreader H I, constructed as described, in combination with the band-cutter E G, carrier C D, and frame or box A, substantially as herein shown and described, and for the purpose set forth.

P. G. BIGGS.
H. A. BUTLER.
H. GRANGER.

Witnesses:
T. W. REED,
F. A. JONES.